United States Patent [19]

Hoppe et al.

[11] 4,099,280
[45] Jul. 11, 1978

[54] HULL, MOLD THEREFOR, AND PROCESS FOR PRODUCING SAME

[75] Inventors: Peter Hoppe, Troisdorf; Helmut Leyer, Opladen; Johann Müller, Koeln-Flittard, all of Germany

[73] Assignee: Bayer Aktiengesellschaft, Leverkusen, Germany

[21] Appl. No.: 532,132

[22] Filed: Dec. 12, 1974

Related U.S. Application Data

[62] Division of Ser. No. 219,277, Jan. 20, 1972, abandoned.

[30] Foreign Application Priority Data

Feb. 1, 1971 [DE] Fed. Rep. of Germany ....... 2104585
May 7, 1971 [DE] Fed. Rep. of Germany ....... 2122581

[51] Int. Cl.² ............................................... B63B 5/24
[52] U.S. Cl. ...................................................... 9/6 P
[58] Field of Search .................... 264/46.5, 46.4, 46.6, 264/46.7, 90, 299, 313, 314; 9/6 P

[56] References Cited

U.S. PATENT DOCUMENTS 3,840,926 10/1974 Stoeberl .................................. 9/6 P

*Primary Examiner*—Trygve M. Blix
*Assistant Examiner*—Stuart M. Goldstein
*Attorney, Agent, or Firm*—Burgess, Dinklage & Sprung

[57] ABSTRACT

Marginal zone-reinforced foam moulding, especially for hulls, are produced in situ technique by coating the inner surface of a mould with a viscous, hardenable adhesive or gel-coat; placing a fiber-reinforcing insert into this layer while it is still viscous; laying an airtight flexible film on this insert and sealing it off outside its dimensions; subsequently removing the air present between the mould and the film under suction and simultaneously pressing the reinforcing insert into the layer of adhesive or gel-coat; removing the film; closing the mould; introducing a liquid, expandable reaction mixture into the mould cavity; and removing the foam moulding from the mould on completion of foaming.

8 Claims, 11 Drawing Figures

U.S. Patent  July 11, 1978  Sheet 1 of 4  4,099,280
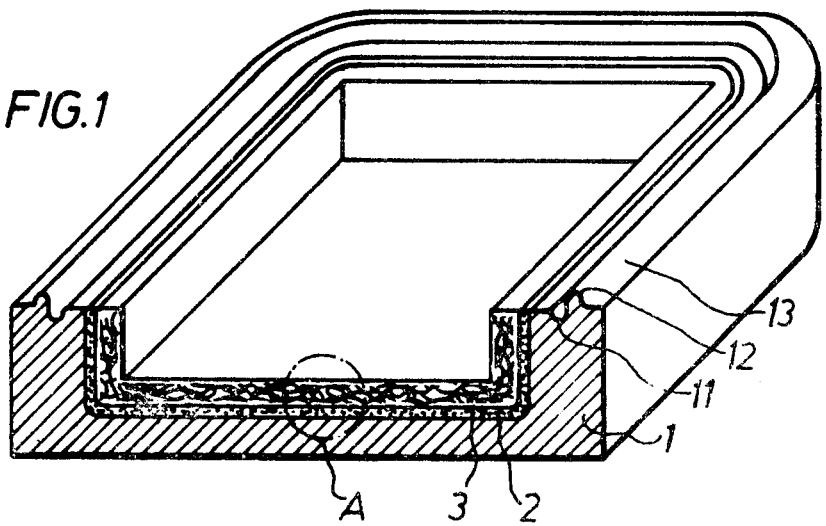
FIG.1
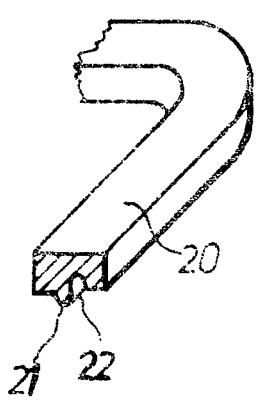
FIG.4
FIG.2
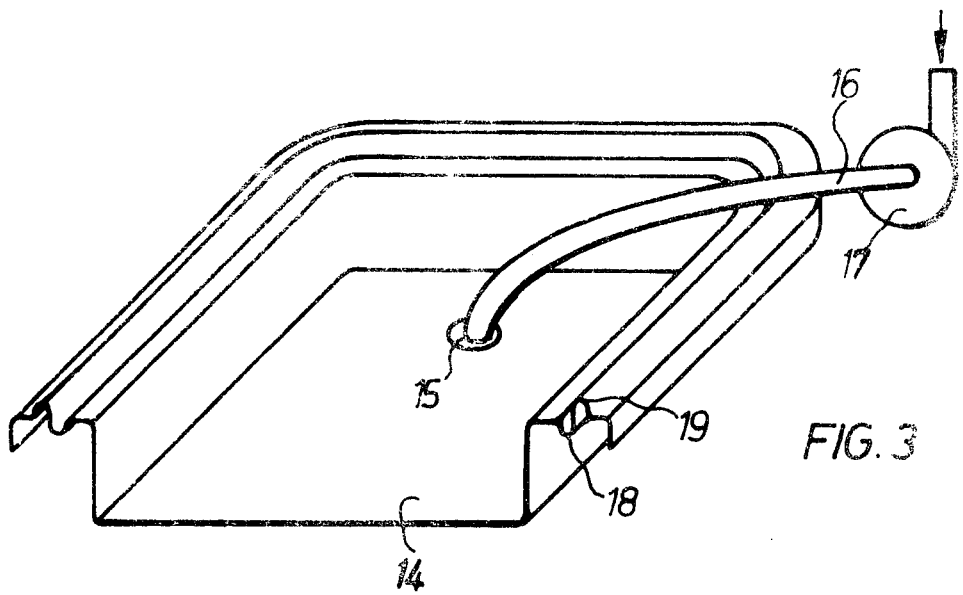
FIG.3

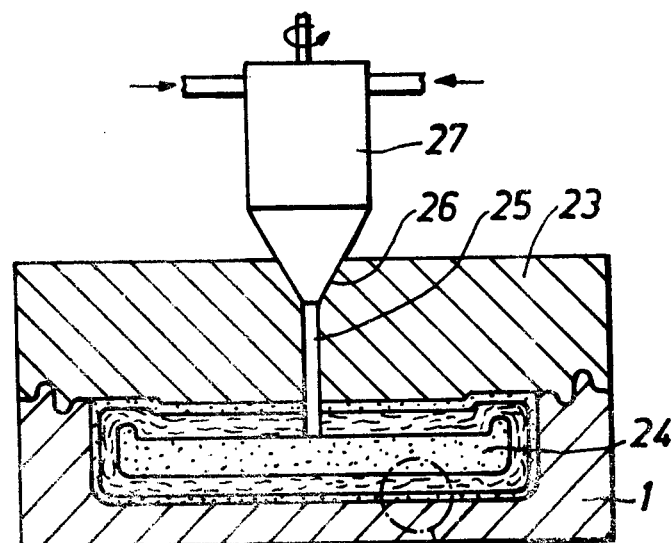
FIG. 7
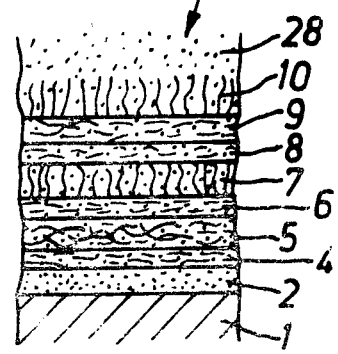
FIG. 8
FIG. 9
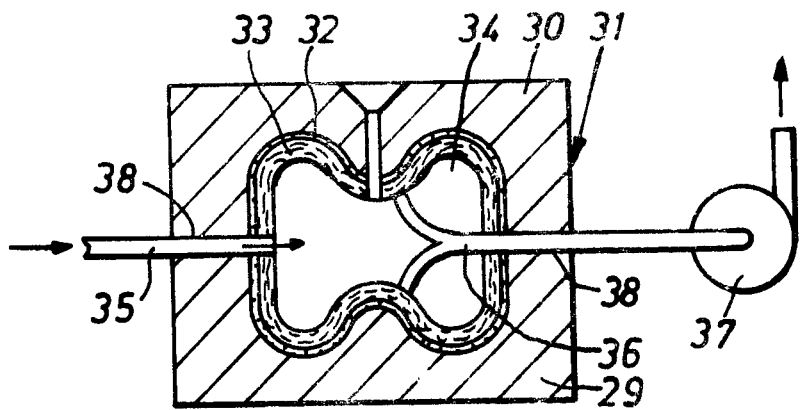

HULL, MOLD THEREFOR, AND PROCESS FOR PRODUCING SAME

This application is a division of Ser. No. 219,277, filed Jan. 20, 1972 now abandoned.

This invention relates to a process and an apparatus for the production of marginal zone-reinforced foam mouldings by the foaming in situ technique.

High-strength foam mouldings, especially hard foam mouldings, are increasingly being used for applications where in the past metal- or mineral-based materials have been used. In the motor vehicle industry, for example, bodywork, bodywork sections, air frames, and hulls, have revently been produced in the form of marginal zone-reinforced foam mouldings by the filling technique. This particular technique has also been used in the building construction industry, for example for the production of sanitary fittings, such as shower basins, baths, and walls. In the furniture industry, refrigerators among other things have already been mass produced by the foaming in situ technique.

It is absolutely essential for the marginal zones or edges of objects such as these to be reinforced in order to enable them to withstand heavy stressing. This is achieved in known manner either by employing a preformed outer skin or a hardenable gel-coat layer in which woven fabrics are embedded. Combinations of an outer skin with a gel-coat are also known. Additionally, these woven fabrics have placed on them fibre-based nonwovens in which the liquid, expandable reaction mixture initially collapses on penetrating and only expands after the fibre-free core has formed. A foam of relatively high density coupled with a relatively high energy-absorption capacity is formed in the vicinity of the nonwoven fabric.

Foam structures of this kind have never been widely produced in practice because the methods used to produce relatively simple structures cannot compete in terms of cost with the conventional tried and tested methods. In particular, conventional processes for the production of foam structures have always involved particularly high labour costs. For example, the inner surface of a preformed outer skin has to be coated with an adhesive, or a contour mould must be coated with a layer of gel-coat. This operation is relatively easy to carry out using a spray gun, but introduction of the reinforming inserts requires particular care. It is common practice manually to introduce glass-fibre mats, metal skeletons, and woven fabrics, into the layer of adhesive or gel-coat and/or manually to anchor fibre-based nonwovens therein. Mat-like combinations of woven fabrics with fibre-based nonwovens are also commercially available and can be embedded in the form of a carpet in a layer of adhesive or gel-coat. These carpets have to be embedded by hand with particular care to ensure that they are everywhere penetrated to a uniform depth by the layer of gel-coat. One particular disadvantage in this respect is that the strength with which the carpets are anchored in the layer of gel-coat or adhesive is governed by the care applied by the operator. If there are areas in which the inserts are not anchored, or are only partly anchored, in the layer of adhesive or gel-coat, there is a danger either of air bubbles being formed in these areas following penetration of the foamable mixture, or of the inserts being lifted by the fomable mixture and thus becoming detached. In either instance, there is no guarantee of the strength required. Another drawback of this so-called "hand lay up process" is that the amount of time involved is considerable. As a result, the period of time for which the mould is occupied is relatively long becuase, logically, only a certain number of operators can be allowed to work simultaneously at one contour mould if they are not to get in one another's way. On account of the different ways in which manual work is carried out, the fact that several operators are employed at a single workpiece for carrying out the same kind of work is a problem in any case.

The object of the present invention is to make a contribution towards improving the quality of edge-reinforcement of foam mouldings produced by the filling technique by avoiding as much manual work as possible during production. Another object of the invention is to reduce to a minimum the amount of time required to apply an undercoat and the edge-reinforcing inserts.

According to the invention, this object is achieved by a process comprising the following steps:

(a) coating the inner surface of a mould with a viscous, hardenable adhesive or with a gel-coat;

(b) placing an marginal-zone reinforcing insert on the gel-coat or on the layer of adhesive while it is still viscous;

(c) placing an air-tight, flexible film over the marginal-zone reinforcing insert and is sealed off outside the vicinity of the reinforcing insert on the mould or outer skin;

(d) evacuating the air present between the mould or outer skin and the film under suction whereby the reinforcing insert is pressed into the layer of gel-coat or adhesive;

(e) removing the film;

(f) closing the mould;

(g) introducing a foamable liquid reaction mixture into the mould cavity; and (h) after the expanding mixture has foamed to completion, removing the finished foam moulding from the mould.

Undercoats, for example based on unsaturated polyester resins, epoxy resins or, preferably, polyurethane-based polyaddition systems are used for stage (a) of the process. When polyurethane formulations are used, water and gases have to be carefully removed from the polyol component in order to obtain a totally impervious, porefree surface on the completed composite foam material when the surface of this material consists of a gel-coat, even when finished material is exposed to temperatures as high as 170° C.

These undercoat compositions are preferably made up in such a way that they harden over a period commensurate to that in which the process is completed, i.e. they should not harden immediately, but instead as soon as possible after all the preparatory work, including pressing in by means of the film, has been carried out. Accordingly, allowance has to be made here for the time required to apply the layer of adhesive or gel-coat, to apply reinforcing inserts and nonwovens if any, to apply the film and to remove the air under suction. The times can differ appreciably from one another, depending upon the contour of the foam moulding and upon the type of reinforcement to be introduced, and if necessary should be determined by tests.

Any inserts of the kind which hitherto have been commonly used for marginal zone-reinforcement, for instance perforated webs, woven fabrics, and nonwovens, of metal or plastics or of fibres of these materials, and combinations of the aforementioned structures, can be used as the marginal zone-reinforcing inserts for stage (b) of the process. If, for example, it is desired to introduce the aforementioned carpet material as reinforcing insert into the layer of gel-coat, the thickness of the layer of gel-coat can be regulated during application in such a way that a single one or several layers of the carpet are fully impregnated by the gel-coat. In the most common method of reinforcement using glass fibres, for example, a predetermined proportion of glass, as high as 50% by weight, or even higher, can be adjusted in this way in the layer of gel-coat. The remaining part of the carpet which is remote from the layer of gel-coat remains free from gel-coat and is later impregnated by foam. In order, for example with body work for motor vehicles, to obtain greater energy absorption in the event of head-on collisions, a second layer of glass fibre cloth of a reinforcing carpet surrounded by fine-denier nonwovens is penetrated only by foam having a bulk density of from 150 to 500 kg/m$^3$.

When the film is applied in stage (c) of the process, every effort must be taken to ensure that it is applied as free from creases as possible, in order to establish firm contact. Tests have shown, however, that the formation of relatively small creases or bubbles is not harmful. The film must be sealed along its edges to prevent extraneous air from being drawn in and to ensure that the marginal-zone-reinforcing insert is in really firm contact with the adhesive or gel-coat-layer. Following removal of the film in stage (e) of the process, the mould is closed, stage (f).

In the most simple instance, only one half of the mould, or part of the surface thereof, need be treated in the manner described. As a rule, however, the mouldings in question will be complicated, edge-reinforced mouldings, for example, sanitary fittings, motor vehicle bodies or ships' hulls. In such instances, two half shells with reinforcing inserts are preferably produced in the manner described above, are subsequently joined together and introduced into a jig in order finally to fill the free inner space with foam. Removal from the mould is only carried out after the foaming reaction.

This process has proved to be of considerable advantage, but one minor disadvantage is that the sealing zone between the film and the mould or outer skin does not provide a complete seal quickly enough to permit very rapid evacuation of air of the space between the mould wall and the film.

According to one particular embodiment of the invention, therefore, the sealing stage (c) of the process is carried out by removing, under suction, the air present in the sealing zone between the film and the mould or outer skin. Removal of the air present in the sealing zone under suction in this way gives a much quicker and safer sealing effect, so that it is impossible for any extraneous air to be sucked in during evacuation of the air from the vininity of the reinforced insert.

Evacuation of the air from the sealing zone is preferably carried out before evacuation of the air from the vicinity of the reinforced insert. By virtue of this measure, a seal has already been formed when evacuation of the reinforcing insert begins.

A rubber cloth or similar material can be used with advantage as the air-tight flexible film suitable for the production of simple foam mouldings. A rubber cloth of this kind is not always suitable for the production of complex foam mouldings because its elasticity is not sufficient to enable it adequately to adapt to every irregularity. A film substantially corresponding to the foam moulding in contour, allowing for the thickness of the edge-reinforcing insert (there is no need to allow for the thickness of the gel-coat) is preferably used in this case.

In one particularly advantageous embodiment of the process, a sac-film is introduced into the mould and the mould is subsequently closed. In this embodiment, both halves of the mould are covered beforehand with an undercoat and with marginal-zone-reinforcing inserts. The sac-film is inflated and, at the same time, the air present between the film, undercoat and edge-reinforcement is removed under suction.

Naturally, the process lends itself to several modifications. In particular, it is suitable both for batchwise production in moulds closed on all sides, and also for continuous production in endless moulds, for example in the manufacture of sandwich sheeting. The process according to the invention is also suitable for filling with foam individual moulds carried by a conveyor belt or by a turntable.

The air-tight film used according to the invention can be produced with advantage by applying a dummy whose thickness corresponds to that of the edge-reinforcing isnert, to the inner wall of the mould, coating the dummy with a mould release agent, applying a layer of hardenable plastics material and hardening this layer. In an alternative embodiment, the film is produced by applying a dummy whose thickness corresponds to that the edge-reinforcing insert, to the inner surface of the mould, optionally coating the dummy with a mould release agent, and bonding together pirces of rubber cloth. Which of the two methods of production is used, will be determined by the particular operating factors, and also by the type of contour of the foam moulding to be produced. If the film is to be produced from a hardenable plastics material, it is preferred to employ for this layer sprayable polyurethane-elastomer systems which react to completion in the absence of heat.

The process according to the invention can be used not only for producing marginal-zone-reinforced foam mouldings, but also purely and simply for producing prefabricated surface or cover layers of metal or plastics coated with a layer of adhesive or gel-coat, with a covering having a sheet structure, preferably in the form of a nonwoven combination. This structure can then be coated, for example with another layer of gel-coat or with a duroplast or thermoplast.

For carrying out the process bathwise, the invention provides an apparatus comprising a mould, with an airtight, flexible film which can be placed on the inside of the mould and has at least one evacuation socket adapted to be connected to an evacuation pump.

For carrying out the process bathwise, the invention provides an apparatus comprising a mould, with an airtight flexible film which can be placed on the inside of the mould and has at least one evacuation socket adapted to be connected to an evacuation pump.

For carrying out the process continuously, the invention provides an apparatus comprising a double conveyor belt made up of an upper belt, a lower belt, a surface layer feed, a mix distributor and, optionally, side boundaries. The novel aspect of this apparatur is that, looking in the working direction, the mix distributor is preceded by a station at which an adhesive or gel-coat is applied and by at least one station for applying reinforcing inserts and by at least one endless, elastic contact belt comprising an airtight, flexible film provided with evacuation sockets which comprise slide elements in sliding contact with a hollow evacuation rail connected to a suction pump.

In this arrangement, the cover layer feed comprises, for example, a roller station for offwinding coversheet film, or a station for feeding sheets, or a station for spraying on a hardenable plastics mixture and for applying a fibre-based reinforcement to be embedded. The film revolving as an endless contact belt travels at the same speed as the double conveyor belt.

When flat, non-contoured or only gently contoured cover layers are used, it is also possible to employ contact rollers for embedding the reinforcing inserts in the layer of gel-coat. When, however, the cover layers are heavily contoured sheets, with a view to providing a high degree of stiffness, the apparatus described above can be used with advantage for production.

In one advantageous embodiment of the invention, at least one sealing element is provided at the edge of the mould, whilst lay-on profiles are provided with at least one corresponding sealing element. The sealing elements preferably consist of a groove and bead. In the most simple instances, frames are used as the lay-on profiles, the moulds in question being individual moulds. With endless moulds, these sealing elements are preferably provided at the lateral boundaries.

In another preferred embodiment of the apparatus at least one sealing element is provided in the form of a groove at the edge of the mould, the cavity of the groove being designed to be connected through an evacuation pipe to a suction pump.

When the air is evacuated from the groove, the film is sucked into the groove and engages with the walls thereof in air tight fashion.

The groove is preferably in the form of a V into which a wedge-shaped bead preferably engages when the film is applied. By using wedge forms for the groove and for the bead, it is possible to obtain a better sealing effect, because the bead is sucked tightly into the groove.

The bead can be arranged on a sealing profile designed to be placed over the film. Alternatively, the film itself is provided with a bead. The advantage of this is that fewer individual components are required, although the film must show a certain level of stiffness. When the film is a thin highly elactic rubber cloth, a peripheral bead such as this is extremely difficult to produce and manipulate. In another embodiment of the invention, it has proved to be of advantage for the films to be reinforced by a stretch-fabrid insert, at least in the vicinity of the seal, in order to profice a certain degree of stiffness.

An insert such as this can be, for example, a two-bar warp loop fabric woven from 44 dtex polyamide filaments textured by the false-twist technique. In the absence of a coating, the insert weight approximately 80/g/m$^2$ and is elastic in all directions.

The evacuation pipe for evacuating the sealing zone can lead either through the mould from the bottom of the groove to a suction pump, or through the bead of the film. The evacuation pipes leading to the vicinity of the reinforceing insert, and those leading away from the sealing zone, are preferably connected to a common suction pump. This has the advantage of a smaller outlay on machinery.

In order to allow control of the relative rates of evacuation of the sealing zone and of evacuation from the vicinity of the reinforcing insert, shut-off elements are arranged in the evacuation pipes, according to one particularly advantageous embodiment of the invention. These shut-off elements enable the operator initially to evacuate the sealing zone, for example by opening the shut-off element in the evacuation pipe for the sealing zone, and then to keep it under reduced pressure by continuing to remove air or even by closing the shutt-off element again, and subsequently to open the shut-off element arranged in the evacuation pipe leading to the vicinity of the reinforcing insert and to evacuate this zone.

Finally, a third shut-off element, advantageously arranged on a branch socket in a common section of the evacuation pipe, is used to ventilate both zones after the reinforcing insert has been pressed in.

According to one particularly advantageous embodiment of the invention, the shut-off elements are adapted to be actuated through a control unit. This contral unit responds, for example, to reduced-pressure gauges which, one a predetermined reduced pressure has been reached, actuate a servomotor through an impulse generator in order to adjust the particular valve which has responded.

Another preferred embodiment of the apparatus, for carrying out the process batchwise, comprises two foaming mould halves which are designed to be placed one on top of the other and closed, and in whose mould cavity a sac-like, airtight flexible film provided with evacuation sockets designed to be connected to a suction pump is arranged. The sac-like film is preferably provided with an air-inlet socket. In this way, the sac-like film can be inflated to ensure film contact with the reinforcing inserts.

The film preferably corresponds in contour to at least part of the final contour of the foam moulding to be produced less the thickness of the reinforcing insert. In general, the thickness of the layer of gel-coat can be discounted, because part of the reinforcing insert is pressed into the layer. In one particularly simple embodiment of the apparatus according to the invention, the film comprises a rubber cloth. In an alternative embodiment, the film comprises a hardened, elastic plastics composition.

Various embodiments of the apparatus are illustrated purely diagrammatically in the accompanying Drawings and are discussed in more detail in the following description. In the accompany Drawings:

FIG. 1 is a section through and perspective view of one half of a mould.

FIG. 2 shows section A of FIG. 1 on an enlarged scale.

FIG. 3 shows a film for the mould half shown in FIG. 1. both in section and in perspective view.

FIG. 4 shows part of a sealing profile for the mould half illustrated in FIG. 1.

FIG. 7 is a section through a closed foaming mould in which the foam moulding has already foamed to completion.

FIG. 8 shows section B of FIG. 7 on an enlarged scale.

FIG. 9 is a sectioned through a closed mould with a sac-like film.

Figure 5:
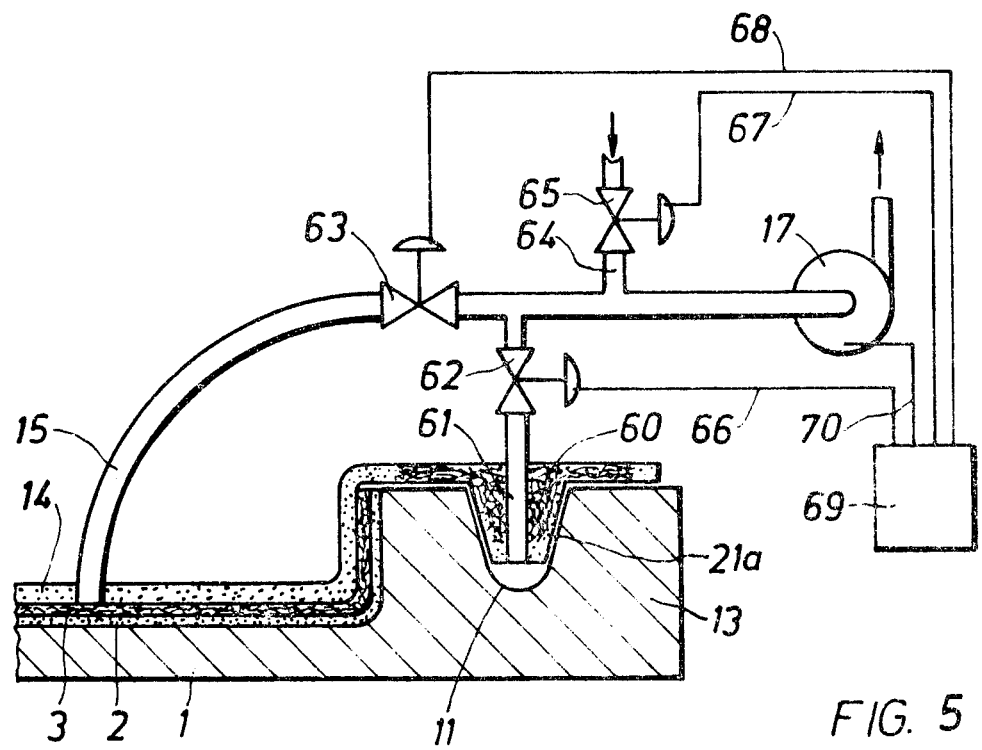
FIG. 5 is a section through a mould with a film applied thereto, and a control unit for the evacuation system.

Referring now to the Drawings, FIG. 1 shows a mould half 1 which has been pre-treated with a release agent. A layer 2 of gel-coat has been applied, by means of a spray gun, to the layer of release agent in a quantity of 165 g/m². The gel-coat comprises a carefully dehydrated and degassed polyurethane formulation and has a hardening time of about 10 minutes. A carpet-like edge-reinforcing insert 3 has been manually applied to the layer 2 of gel-coat. Its structure is seen more clearly from FIG. 2 and comprises the following layers, beginning from the layer 2 of gel-coat (a) a layer 4 of glass cloth (163 g/m²),
(b) a fine-denier synthetic fibre nonwoven 5 having a denier of approximately 5 dtex; (100 g/m²);
(c) a layer 6 of glass cloth (163 g/m²);
(d) a fine-denier synthetic fibre nonwoven 7 (100 g/m²) having a denier of 5 dtex;
(e) a layer of glass cloth 8 (163 g/m²);
(f) a fine-denier synthetic fibre nonwoven 9 having a denier of approximately 5 dtex (250 g/m²); and
(h) a coarse-denier synthetic fibre nonwoven 10 having a denier of from 40 to 80 dtex (approx. 150 g/m²).

All the layers have needled together to form a kind of carpet. The mould half 1 is provided along its edge 13 with an encircling groove 11 and a bead 12 acting as sealing elements.

FIG. 3 shows an airtight, flexible film 14 adapted to the contour of the foam moulding to be produced, less the thickness of the marginal-zone-reinforcing insert adapted to be placed on the edge-reinforcing insert 3. The film 14 has an evacuation socket 15 whose hose 16 is connected to a vacuum pump 17. Corresponding to the groove 11 (FIG. 1), the film 14 has a bead 18, and, corresponding to the bead 12 (FIG. 1), a groove 19. Finally, a sealing profile 20 (shown in FIG. 4) is placed on. It has a bead 21 which engages with the groove 11 (FIG. 1). The bead 13 (FIG. 1) then projects into its groove 22. The vacuum pump 17 is then actuated for about 10 minutes. The air between the film 14 and the layer 2 of gel-coat is thus removed and, under this suction effect, the marginal-zone-reinforcing insert 3 is pressed into the layer 2 of gel-coat with its first fabric layer 4. The vacuum is maintained until the layer of gel-coat has hardened, i.e. for about 10 minutes. The sealing profile 20 and the film 14 are then removed again. The second mould half has meanwhile been prepared in the same way.

In FIG. 5, the inner wall of one mould half 1 has been pre-treated with a release agent to which a gel-coat layer 2 has been applied. An marginal-zone reinforcing insert 3 is placed on the gel-coat layer 2. The mould edge 13 has a groove 11. A film 14 provided with an evacuation pipe 15 lies on the marginal-zone reinforcing insert 3 and on the edge 13 of the mould. The film 14 is provided with a bead 21a in the sealing zone. In addition, this area of the film is reinforced by a stretch-fabric insert 60. An evacuation pipe 61 provided with a shut-off element 62 extends through the bead 21a, opening into evacuation socket 15. The evacuation pipe 15 leads to a suction pump 17. Looking from the suction pump 17, another shut-off element 63 is arranged in the evacuation pipe 15 behind the junction with the evacuation pipe 61. Finally, a venting socket 64 having a shut-off element 65 branches off from the evacuation pipe 15.

The shut-off elements 62, 63 and 65 are connected through impulse lines 66, 67 and 68 to a control unit 69.

The control unit 69, which in practice is made up of several sub-units, works are follows: the suction pump 17 is switched on and, through the impulse line 70, releases in the control unit 69 an impulse which opens the shut-off element 62 but closes the shut-off elements 63 and 65, if they are still open. After a predetermined time interval, to which the control unit is adjusted and which experience has shown to be sufficient for adequately sealing the bead and the groove, the shut-off element 62 is closed so that the reduced pressure applied between the groove 11 and the bead 21a remains intact. (In one variation, the shut-off element 62 remains open throughout the entire period of operation, so that the sealing zone is under a suction effect in order to prevent the seal from being loosened through leakage). At the same time, the shut-off element 63 is opened through the impulse line 68 for a predetermined time interval, which is adapted to the extent that the edge-zone reinforcing insert 3 is adequately forced into the gel-coat layer under the evacuating effect. At the end of this time interval, the shut-off element 62 is opened again simultaneously with the shut-off element 65 in the venting socket 64. At the same time, the suction pump 17 is switched off. Under the resulting ventilating effect, the vacuum in the sealing zone and in the vicinity of the reinforcing insert is broken so that the film 3 can readily be removed.

Figure 6:
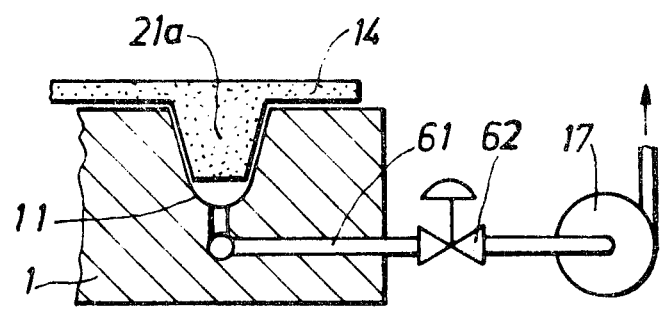
FIG. 6 is a section through a mould comprising a different system for evacuating the sealing zone.

In FIG. 6, the evacuation pipe 61 is arranged in the mould half 1 and leads outwards away from the bottom of the groove 11 to the suction pump 17. A hand-operated shut-off element 62 is provided in the evacuation pipe 61. In this instance too, the film 14 is provided with a bead 21a.

FIG. 7 shows both mould halves 1 and 23 closed with the foam moulding 24 already having foamed to completion in the mould. A duct 25 and a conical recess 26 for attaching a mixing head 27 are provided in the upper mould half 23. The components delivered to the mixing head 27 have been mixed in it and introduced through the duct 25 into the mould cavity where the expandable, liquid mixture has foamed into a polyurethane foam.

In FIG. 8, the layer 2 of gel-coat has fully impregnated the fabric layer 4. The other layers 6 and 8 of fabric and the nonwovens 5, 7, 9 and 10 have been foamed through. The inner core 28 is free from nonwovens. After the foamable mixture has reacted sufficiently, the completed foam moulding 24 can be removed from the mould 23.

FIG. 9 shows a mould 31 comprises mould halves 29 and 30. This mould 31 has been pre-treated with a layer 32 of gel-coat and a marginal-zone reinforcing insert 33 in the manner described in reference to FIG. 1. A sac-like film 34 is introduced into the mould cavity, air being forced in through its air inlet socket 35 to ensure that the film 34 is in clean contact with the marginal-zone reinforcing insert 33. Air between the film 34 and the layer 32 of gel-coat is then removed through evacuation socket 36 by means of a pump 37, and the edge-zone reinforcing insert 33 is pressed into the layer 32 of gel-coat. Sockets 35 and 36 are situated in sealed bores 38 in the mould-dividing plane.

Figure 10:
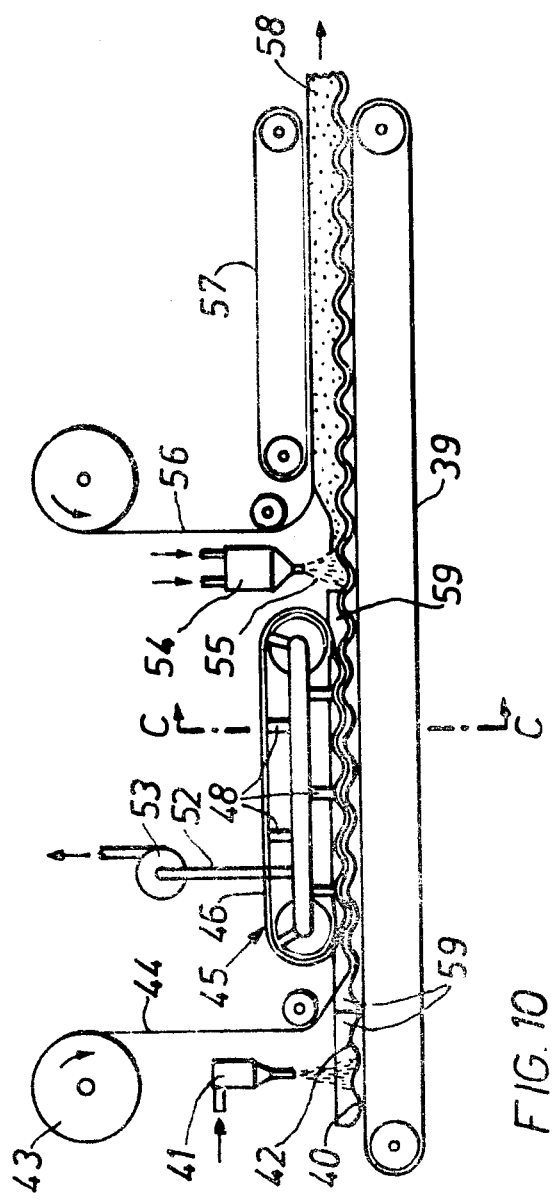
FIG. 10 shows an apparatus with an endless contact film.
Figure 11:
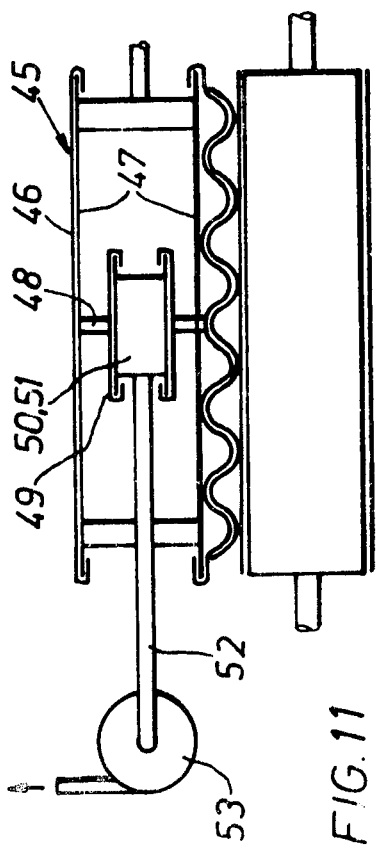
FIG. 11 is a section through the apparatus of FIG. 10 along the line C—C.

In the continuous working apparatus shown in FIGS. 10 and 11, heavily contoured panels 40 with edge frames 59 placed on them are successively placed abutting one another onto a continuous lower belt. 39. A layer 42 of polyurethane adhesive (gel-coat) is sprayed onto the panels 40 in a quantity of 150 g/m² by means of an injection head 41 reciprocating transversely of the lower belt 39. A continuous reinforcing insert 44 is offwound from a roll 43 and applied to the layer 42 of adhesive. The structure of the reinforcing insert 44 corresponds to that described with reference to FIG. 3. The next station comprises a film 46 in the form of a continuous belt 45 arranged above the lower belt 39. The highly elastic, airtight film 46 is kept under tension through an airtight supporting belt 47. Evacuation sockets 48 extend through the supporting belt 47 and the film 46 and each has at the end remote from the film 46, a slide shoe 49 which slides along a hollow evacuation rail 50 in sealed manner. A vacuum pump 53 is connected through an evacuation pipe 52 to the cavity 51 of the evacuation rail 50. The continuous film 46 travels at the same speed as the lower belt 39, namely 1 m/sec. The properties of the adhesive are adjusted by additives in such a way that the reinforcing insert 44 is already fixed in the adhesive layer 42 at the outlet end between the film 46 and the lower belt 39. After the film 46 has been removed, the edge frames 59 are removed. An expandable mixture 55 is then applied to the reinforcing insert 44 by means of a mixing head 54. A cover film 56 is introduced at the inlet end of a continuous upper belt 57. The mixture 55 foams into a foam core 58 which penetrates through the reinforcing insert 44 where it is not embedded in the layer 42 of adhesive. One-sided or asymmetrical sandwich panels are formed in this way.

What is claimed is:
1. A ship's hull comprising:
 a. two hardened adhesive or gel coat, half shells joined together to form the outer surface portions of the hull with space between the shells,
 b. hard foam filling the space between the half shells,
 c. each of said half shells having a marginal zone reinforcing insert embedded in the inwardly disposed portion thereof, each of the marginal zone reinforcing inserts comprising an outer fabric layer which is impregnated by the hardened coat, and an inner fabric which is foamed through by the foam whereby the marginal zones of the shells are reinforced.

2. Ships hull of claim 1, wherein the marginal zone reinforcing inserts are multi-layer inserts.

3. Ship's hull of claim 1, wherein the outer fabric layer of each of the reinforcing inserts is fully impregnated by by its hardened coat and the reinforcing inserts have threads extending therefrom which are embedded in the hard foam.

4. Ship's hull according to claim 3, wherein at least one of the reinforcing inserts has an underlying fibrous layer and threads of the underlying fibrous layer are needled into the overlying layer.

5. A plastic boat body which comprises a molded plastic boat shell, an inner bottom shell in said boat shell and secured around its periphery to the boat shell, said boat shell and inner bottom shell providing a chamber therebetween, an insitu cast hard foam plastic core filling said chamber in full conformity therewith, fiber lamination sheets integrally bonded to and covering the faces of the boat shell and inner bottom defining said chamber, plastic from the boat shell and inner bottom shell being embedded in interstices of said fiber lamination sheets, and fibers of said lamination sheets surrounded by the cast foam plastic core and embedded therein in locked relation therewith to integrally bond the foam plastic core to the boat shell and inner bottom.

6. The boat body of claim 5 including multi-layer lamination inserts surrounding the foam with the fibers of the laminations embedded in the foam and cemented to the inner bottom and shell.

7. The boat body of claim 5 wherein plastic from the boat shell and inner bottom shell is pulled into interstices of the fiber lamination sheets and interlocks the sheets with the shells and the sheets have threads extending therefrom which are embedded into the hard foam.

8. The boat body of claim 7 wherein at least one of the fiber lamination sheets has an underlying fibrous layer and threads of the underlying layer in the form of loops are pulled into the overlying layer.

* * * * *